Dec. 16, 1969  R. J. DAWSON  3,484,295
BATTERY HAVING A POSITIVE ELECTRODE IN WHICH THE PRINCIPAL
ACTIVE MATERIAL IS ISOLATED FROM THE ELECTROLYTE BY
A SECONDARY ACTIVE MATERIAL
Filed July 20, 1966
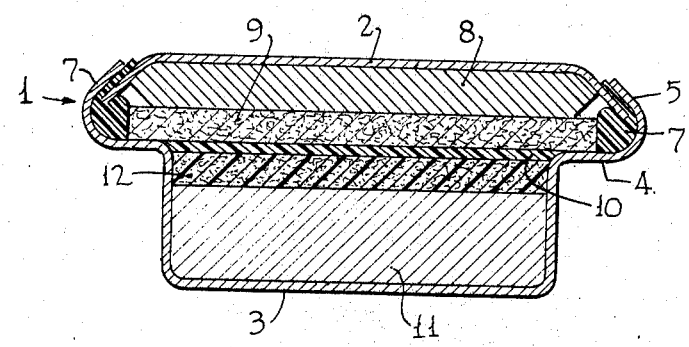

United States Patent Office 3,484,295
Patented Dec. 16, 1969

3,484,295
BATTERY HAVING A POSITIVE ELECTRODE IN WHICH THE PRINCIPAL ACTIVE MATERIAL IS ISOLATED FROM THE ELECTROLYTE BY A SECONDARY ACTIVE MATERIAL
Robert J. Dawson, Madison, Wis., assignor, by mesne assignments, to ESB Incorporated, Philadelphia, Pa., a corporation of Delaware
Filed July 20, 1966, Ser. No. 566,622
Int. Cl. H01m 11/00, 33/00
U.S. Cl. 136—100                                    7 Claims

ABSTRACT OF THE DISCLOSURE

A battery having a positive electrode comprising a principal active material (e.g. divalent silver oxide, potassium permanganate, cupric oxide, sulfur) and a secondary active material (e.g. monovalent silver oxide, mercuric oxide, manganese dioxide) which is stable in the battery electrolyte. The secondary active material is employed as a substantially electrolyte impermeable layer, such as being dispersed in a suitable plastic material, which is interposed between the principal active material and the battery components containing the electrolyte so as to isolate the principal active material from contact with the electrolyte until the secondary active material is discharged. The battery can be discharged at a single potential if the discharge product of the secondary active material is oxidized by the principal active material in the presence of the battery electrolyte.

The present invention generally relates to battery electrodes. More specifically, this invention is concerned with a new and improved electrode characterized by good shelf life and stability on stand.

Certain materials have inherently high electrochemical capacities and the ability to deliver this capacity at high rates of discharge. Some of these materials, however, are not well suited for use in battery electrodes because they either gas when in contact with the electrolyte or go into solution in the electrolyte. Either type of decomposition limits the usefulness of the material for battery application particularly where long periods of shelf life or stand are required.

It is an object of the present invention to provide an electrode structure which minimizes the effect of the instability of the principal active material.

It is an object of the present invention to provide an a new and improved electrode structure in which an unstable active material is effectively isolated from contact with the electrolyte until the electrode is discharged.

It is also an object of the present invention to provide an electrode structure which is characterized by discharging at a potential lower than that of the principal active material.

In accordance with the present invention, a lower potential discharge is achieved by means of an electrode structure in which a higher potential principal active material of the electrode is effectively isolated from ionic contact with an electrode of the opposite polarity by means of a relatively impermeable layer containing a lower potential secondary active material. In addition to the effective ionic isolation of the principal active material from the electrode of the opposite polarity, two other conditions must be met to achieve the lower potential discharge. The discharge product of the lower potential secondary active material must be oxidizable by the higher potential principal active material and the secondary active material must also be in electronic contact with the principal active material.

It is still another object of the present invention to provide an improved electrode construction which is particularly adapted for "button" cells.

It is a further object of the present invention to provide a new and improved "button" cell characterized by a high capacity and good shelf-life characteristics.

In accordance with the present invention, the principal active material of the electrode is effectively isolated from contact with the electrolyte until discharge of the electrode has begun. For this purpose, the electrode of the present invention utilizes, in addition to the principal active material, a secondary active material which is stable in the electrolyte of the battery in which the electrode is to be used. The secondary active material is present in a substantially electrolyte impermeable layer which layer in its undischarged state, effectively isolates the principal active material from contact with the electrolyte. Upon discharge of the secondary active material in the layer, the layer becomes electrolyte permeable whereby the electrolyte can contact the principal active material.

While not limited thereto, monovalent silver oxide, mercuric oxide and manganese dioxide are examples of active materials which are stable in alkaline electrolyte and thus ideally suited for use as the secondary active material in the barrier or masking layer of an electrode in accordance with the present invention. The use of these materials in the massing layer permits the utilization of such high capacity, unstable active materials as divalent silver oxide, potassium permanganate, cupric oxide or sulfur, all of which either evolve oxygen in alkaline electrolytes, or are readily soluble in such electrolytes.

The discharge characteristics of a cell incorporating an electrode in accordance with the present invention will depend upon the materials utilized as the principal and secondary active materials. Where the discharge product of the secondary active material is oxidized by the principal active material, a uni-potential discharge can be obtained at the potential characteristic of the secondary active material. Where the discharge product of the secondary active material is not oxidized by the principal active material, the electrode will assume the potential characteristic of the principal active material when electrolyte is made available to the principal active material through the masking layer containing the secondary active material.

A better understanding of the present invention may be had from the following description when read with reference to the drawing which shows a cross-sectional view of a primary cell having a positive electrode in accordance with the present invention.

Referring now to the drawing, there is shown a sectional elevation of a silver-zinc cell, designated by the numeral 1, having a positive electrode in accordance with the present invention. The cell 1 is conventional in all respects with the exception of the construction of the positive electrode. The cell 1 has a two-part container comprising an upper section or cap 2 which houses the negative electrode, and a lower section or cup 3 which houses the positive electrode. As shown, the bottom cup 3 is formed with an annular shoulder 4 having a flange 5 which is crimped inward during assembly to seal the cell. The bottom cup 3 may be made of nickle plated steel, and the cap 2 may be made of tin plated steel. The cap 2 is insulated from the cup 3 and the flange 5 by means of a grommet 7 which is compressed between the cap 2 and the flange 5 during the crimping operation of cell assembly to provide a compression seal between these parts. The grommet 7 may be made of a suitable resilient electrolyte resistant material such as neoprene.

The negative electrode of the cell 1 comprises a lightly compacted pellet 8 of finely divided amalgamated zinc. The zinc electrode 8 is separated from the positive electrode by means of an electrolyte absorbent layer 9 and a membrane barrier 10. The electrolyte absorbent layer 9 may be made of an electrolyte resistant, highly absorbent substance such as matted cotton fibers. Such a material is available commercially under the trademark "Webril." The barrier layer 10 may be a suitable semi-permeable material such as cellophane, or comprise a suitable organic carrier such as polyethylene or polyvinyl chloride having a polyelectrolyte homogeneously dispersed therethrough. Such a material is described and claimed in U.S. Patent No. 2,965,697 issued Dec. 20, 1960, to J. C. Duddy.

The positive electrode of cell 1 comprises, in accordance with the present invention, a body 11 of divalent silver oxide which is the principal active material of the electrode. The divalent silver oxide 11 is housed in the bottom cup 3 and is covered by a masking layer 12 of monovalent silver oxide dispersed in a substantially continuous phase throughout an electrolyte resistant binder such as polystyrene. The body 11 of the diavalent silver oxide comprises the majority of the active material available in the electrode for discharge. The masking layer 12 effectively remains electrolyte impermeable until substantially all of the monovalent silver oxide therein is discharged. Porosity is developed throughout the masking layer 12 upon discharge of the monovalent silver oxide as a result of the volumetric decrease which accompanies the reduction of the monovalent silver oxide to silver on discharge. By means of the layer 12, contact between the body of divalent silver oxide 11 and the cell electrolyte is prevented until cell discharge has proceeded to the point where substantially all of the monovalent silver oxide in the masking layer 12 has been discharged. Since any reaction between the divalent silver oxide and the electrolyte is prevented, the cell will have excellent stand characteristics.

As explained hereinbefore, the principles of the present invention are applicable to materials other than divalent silver oxide and monovalent silver oxide. By way of illustration and not by way of limitation, the masking layer 12 of an electrode in accordance with the present invention may comprise, in addition to monovalent silver oxide, mercuric oxide, managanese dioxide, or any other electrolyte stable active material homogeneously dispersed in a substantially continuous phase throughout any suitable electrolyte resistant binder. Some examples of suitable principal active material which can be used in combination with these secondary active materials are divalent silver oxide, potassium permanganate, cupric oxide and sulfur.

The positive electrode of the cell may be formed in a number of ways. For example, the body of the principal active material may be formed as a pellet by pelletizing a suitable quantity of finely divided principal active material in a pellet die. This pellet can then be united with the masking layer material and consolidated by means of pressure.

The positive electrode for the cell described above comprises a first pellet of divalent silver oxide consolidated in situ in the cathode cup at 15,000 lbs. per square inch of pressure. The masking layer comprises monovalent silver oxide and polystyrene. The particles of monovlaent silver oxide are first coated with polystyrene by mixing the particles in a solution of carbon tetrachloride containing polystyrene in the amount of 1% by weight of the monovalent silver oxide. The coated particles are then consolidated by means of pressure to produce a structurized layer united with the preformed pellet described above. In this operation, the pressure will compress the monovalent silver oxide into a continuous phase throughout the polystyrene to form an electrolyte impermeable masking layer.

It is also possible to form the masking layer by dispersing the secondary active material throughout a suitable plastic such as polyethylene, polypropylene and polytetrafluorethylene or the like by means of heat and pressure in a mill. In this process the plastic is first plasticized and the secondary active material added thereto while the binder is in the plasticized state. The material thus produced can be sheeted to an appropriate thickness by calendaring rolls to produce sheet material from which masking layers can be cut by means of a stamping operation. Masking layers produced in this manner can be united with the remainder of the electrode structure by means of pressure.

The discharge characteristics of a cell incorporating an electrode in accordance with the present invention will depend upon the active material utilized. Generally, it would be expected that the discharge characteristic of an electrode in accordance with the present invention will show a voltage rise or drop from the potential characteristic of the secondary active material when electrolyte is made available for the discharge of the principal active material. The expected change in voltage will be to the voltage characteristic of the principal active material. As noted hereinbefore, however, with certain active materials, electrodes in accordance with the present invention produce single potential discharges at voltages characteristic of the secondary active material. However, the single potential discharge is obtained only where the discharge product of the secondary active material is oxidizable by the principal active material. Secondary active materials such as monovalent silver oxide, mercuric oxide and manganese dioxide which have discharged products which are oxidized by high potential materials such as divalent silver oxide and potassium permanganate may be used in electrodes with either of these materials as the principal active material to provide a single potential discharge.

It is believed that where the single potential discharge is achieved, the geometry of electrode discharge is such that the masking layer functions to effectively isolate the principal active material from ionic contact with the electrode of opposite polarity throughout the discharge of the electrode. During discharge, the secondary active material in the barrier layer is first reduced until the interface with the principal active material is reached. At this time the electrolyte comes into contact with the principal active material and an internal cell within the positive electrode is formed. This internal cell comprises the discharge product of the secondary active material as the negative electrode and the principal active material as the positive electrode. Due to the intimate electronic and ionic contact between these materials, an oxidation and reduction reaction occurs between them which takes precedent over the reaction between the principal active material and the negative electrode of cell which is isolated from it electronically. The effect is manifested in the cell voltages which are at the potential characteristic of the couple formed by the secondary active material and negative electrode under load or discharge and at the potential characteristic of the couple formed by the principal active material and negative electrode on open circuit.

Examples of the performance of cells having different secondary active materials in a layer masking divalent silver oxide are shown in the table below:

TABLE I

| Cell No.: | Secondary active material | Average voltage to 0.8 v. |
|---|---|---|
| 1 | HgO | 1.18 |
| 2 | MnO$_2$ | 1.31 |
| 3 | Ag$_2$O | 1.35 |
| 4 | CuO | 0.98 |

All of the cells tested were button cells and were identical in construction except for the material in the masking layer. The negative electrode in these cells was amalgamated zinc. In cell No. 2, the secondary active material of the masking layer comprised manganese dioxide and carbon in the proportions of 9 to 1. Cell No. 4 incorporated cupric oxide and carbon in the proportion of 4 to 1 in the masking layer. While cupric oxide is not particularly stable in alkaline electrolye and, hence, not ideally suited for utilization in the masking layer, this cell was constructed to illustrate the unipotential principles of the present invention. Polystyrene was used in all of the cells as the binder in the masking layer.

All of the cells tabulated in Table I discharged at a single voltage level and gave no voltage rise which would show the difference in potential level of the material of the masking layer and the divalent silver oxide. The discharges were continuous and the cells were negative limited. In all cases, inspection of the cells after discharge showed that the divalent silver oxide was used completely while some undischarged material remained in the masking layer. Similar cells made with mercuric oxide in the masking layer and with cupric oxide as the principal active material showed discharge curves at two distinct voltage levels. This was to be expected since cupric oxide cannot oxidize mercury. These cells discharged at an average closed circuit voltage of 1.19 volts for 40 ma. hrs. and then the voltage dropped to 0.76 volt, and the remainder of the cell discharge was at this level. Similar electrodes utilizing potassium permanganate as the principal active material have been discharged against zinc at the potential characteristic of the secondary active material in the barrier layer. In this respect, barrier layers in accordance with the present invention have been particularly effective in preventing electrolyte contact with the potassium permanganate principal active material on prolonged stands. Inspection after several months of stand of the cells so constructed showed none of the electrolyte coloration associated with the soluble potassium permanganate.

From the foregoing, it can be seen that by means of the present invention there has been provided electrode means which minimizes the effect of the instability of the principal active material. This permits the utilization of highly active, high capacity but unstable active materials in cells and still provides cells with good stand characteristics. In addition, with certain active materials the electrode of the present invention provides a discharge at a lower potential than that which normally characterizes the principal active material. In this respect, it should be noted that in the case of divalent silver oxide principal active material, an electrode of the present invention provides a means for discharging this material at a single potential, whereas this material customarily discharges at two voltage levels.

Having described the present invention that which is claimed as new is:

1. A battery comprising a negative electrode, an alkaline electrolyte, and a positive electrode comprising a principal active material and secondary active material having a lower potential than said principal active material which lower potential determines the battery voltage throughout discharge, said secondary active material having a discharge product oxidizable by said principal active material, said secondary active material present as an electrolyte impermeable layer which isolates the principal active material from contact with said electrolyte until substantially all of said secondary active material in said layer is discharged whereby said principal active material reoxidizes the discharge product of said secondary active material and is itself reduced, the potential of said battery by virtue of said oxidation and reduction reaction being maintained at the potential characteristic of said secondary active material throughout discharge of said battery.

2. A battery comprising a negative electrode, a positive electrode, a separator between said positive and negative electrodes, and an electrolyte contained substantially wholly within said separator and said negative electrode, said positive electrode comprising a principal active material and a secondary active material, said principal active material having a higher potential than said secondary active material, said secondary active material being stable in the electrolyte and being present in its charged state as a substantially electrolyte impermeable layer interposed between the principal active material and the separator and negative electrode components which contain electrolyte so as to isolate said principal active material from contact with the electrolyte until said secondary active material is discharged whereupon it becomes electrolyte permeable permitting said electrolyte to contact said principal active material.

3. A battery in accordance with claim 2 in which the secondary active material is dispersed in a substantially continuous phase throughout a binder to form the electrolyte impermeable layer.

4. A battery in accordance with claim 3 in which the secondary active material has a lower potential than said principal active material and in its discharged state is oxidizable by said principal active material, whereupon discharge of substantially all of the secondary active material said electrolyte impermeable layer becomes electrolyte permeable allowing said principal active material to oxidize said discharged secondary active material in the presence of said electrolyte, whereby said principal active material is reduced and the lower potential characteristic of said secondary active material is maintained throughout discharge of the battery.

5. A battery in accordance with claim 3 in which the principal active material is selected from divalent silver oxide, potassium permanganate, cupric oxide or sulfur.

6. A battery in accordance with claim 3 in which the secondary active material is selected from monovalent silver oxide, mercuric oxide and manganese dioxide.

7. A battery in accordance with claim 4 in which the secondary active material is monovalent silver oxide and the principal active material is divalent silver oxide.

References Cited

UNITED STATES PATENTS

| 1,452,230 | 4/1923 | Wells | 136—107 |
| 2,796,456 | 6/1957 | Stokes | 136—100 |
| 2,837,590 | 6/1958 | Rhyne | 136—100 |
| 3,057,944 | 10/1962 | Ruetschi et al. | 136—20 |
| 2,542,710 | 2/1951 | Ruben | 136—107 |
| 2,795,638 | 6/1957 | Fischbach | 136—120 |

WINSTON A. DOUGLAS, Primary Examiner

C. F. LEFEVOUR, Assistant Examiner

U.S. Cl. X.R.

130—107, 120